Oct. 25, 1949.  W. D. HALL  2,486,156

HEATER

Filed Oct. 1, 1943

INVENTOR
William D. Hall.

Patented Oct. 25, 1949

2,486,156

UNITED STATES PATENT OFFICE 2,486,156

HEATER

William D. Hall, Elkins, W. Va.

Application October 1, 1943, Serial No. 504,622

12 Claims. (Cl. 237—33)

1

This invention relates to heaters as well as to control systems therefor, and has for its objects the provision of an automobile heater that operates independently of the automobile engine, the provision of a small unit that will give a large amount of heat, the provision of a heater which is safe in operation, the provision of an automobile heater that can be started automatically such as by a time clock before the automobile is started, the provision of a heater having an adjustable amount of heat output, the provision of means in a wick burner for controlling the height of the wick, and the provision of numerous other features, which inhere in the structure and will be obvious to experts from a study of the following description.

In carrying out the foregoing objects I provide in addition to the gasoline tank of the car or automobile, a supplemental small gasoline tank as a part of my heater. Arrangement is made for filling this supplemental tank from the main one or by any other means. Gasoline is taken from the supplemental tank by means of a wick and burned under the influence of strong suction. Strong suction drawing away from the wick creates a very hot flame which not only sounds like a blow torch but has heat output similar thereto. The suction pipe leads from the combustion chamber, which is in the engine compartment of the automobile, through the fire wall of the car and circulates inside of the radiator compartment of the automobile heater. The suction pipe then leads back through the fire wall into the engine compartment and connection is made from it to the suction blower. As a result of this construction, the combustion gases are conducted through the passenger compartment under conditions of partial vacuum and therefore in event of a leak in the suction pipe no exhaust gases can escape into the passenger compartment. In event of a large leak that will destroy the vacuum conditions, the fire in the combustion chamber will be snuffed out due to lack of air, since it is the vacuum which draws air into the combustion chamber through small holes leading thereinto.

The wick may be adjusted to a predetermined height automatically by simply turning a handle in the passenger compartment. This and the other features of my invention can best be understood by reference to the detailed description which follows the explanation of the drawings.

Figure 1:
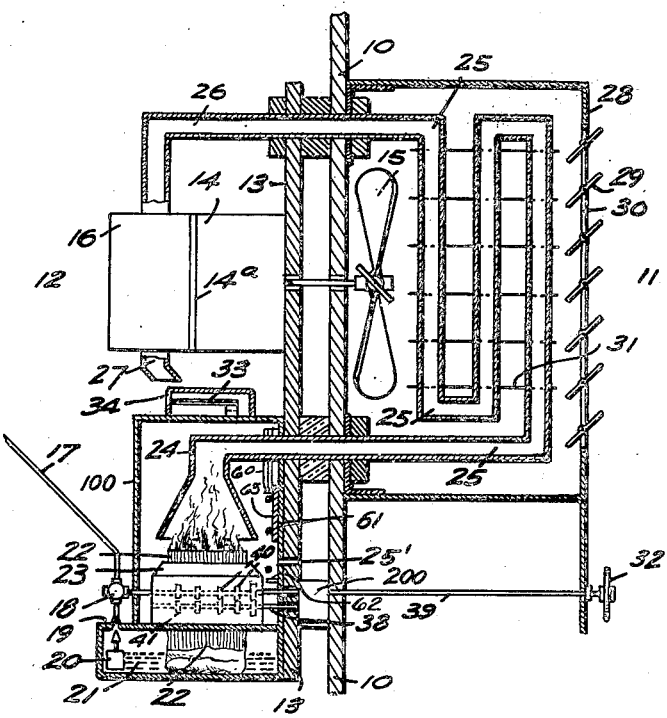
Figure 6:
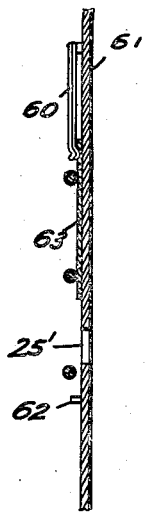
Figure 2:
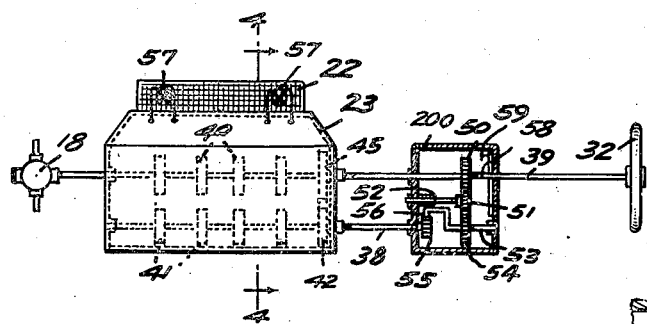
Figure 4:
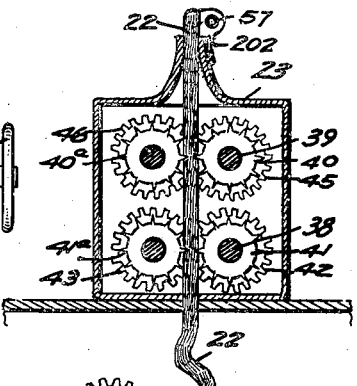
Figure 5:
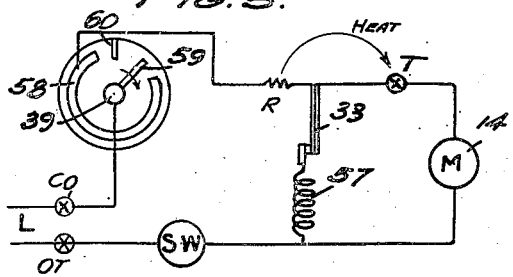
Figure 3:
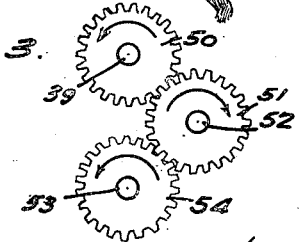

In the drawings, Figure 1 is a sectional view of the heater. Figure 2 is an elevation view of the box containing the wick and includes a showing,

2 in section of a gear box. Figure 3 illustrates a gear train. Figure 4 is a sectional view of the box containing the wick, this section being taken along line 4—4 of Figure 3. Figure 5 is one circuit diagram of the electrical parts. Figure 6 illustrates a detail relating to closing the air supply in event of overheating.

In Figure 1 is shown the fire wall of an automobile, separating the engine compartment 12 from the passenger compartment 11. The engine compartment has the usual internal combustion engine, not shown, for driving the car; and the passenger compartment may be closed in any well-known manner such as by windows and doors. Mounted on fire wall 10 is a supporting base 13 which mechanically supports electric motor 14. The motor 14 drives circulating fan 15 and also the exhaust pump 16. The motor 14 is separated from the exhaust pump by an insulating plate 14a in order to prevent undue temperature rise of the motor. A fuel line 17 supplies fuel to the gasoline tank 21. Line 17 at its top end may connect to the fuel line of the automobile adjacent the carburetor, or it may operate by gravity feed from the carburetor or it may connect to a gasoline tank which is independent of the automobile gasoline supply. If the line 17 is tapped into the fuel line of the automobile adjacent the carburetor, it is obvious that the fuel pump of the automobile will pump tank 21 to its cut-off point whenever the car engine is running. When the car engine stops, enough fuel will remain in tank 21 for several hours of operation and since it is probable the car will be operated again before the heater has operated several hours, it is obvious that the heater will usually be supplied with sufficient gasoline. Float system 20 shown diagrammatically, is arranged to close the fuel line when the tank 21 is filled to a suitable point, such as two-thirds full. The float system 20 is shown cooperating with a valve 19, however these are not shown in detail for the reason that numerous prior art arrangements are available to teach one skilled in the art how to cut off further flow of gasoline when a predetermined level in a tank is reached. A wick 22 extends down and into tank 21 as well as extends up through chamber 23 and out the top thereof as elaborated upon later. A hood 24 is located over the burning wick and gathers the hot gases therefrom and leads them to radiator pipe 25. From the radiator pipe 25, the hot gases pass to exhaust pipe 26, to exhaust blower 16, and out exhaust pipe 27. The suction exhaust blower is mounted on the rear end of motor 14 and is driven by the shaft of that motor, the same shaft that drives fan 15.

Mounted on the elongated radiator pipe are numerous fins 31, and the portion of the heater including these fins which is in the passenger compartment is enclosed by an ornamental and mechanically useful casing 28. Casing 28 has suitable deflectors 29 mounted on the front panel 30 thereof in any well known manner.

The burning fuel is located in a combustion chamber 100. On top of the combustion chamber 100 is a casing 34 containing bimetallic strip 33, the function of which will appear later. Located within combustion chamber 100 is the wick chamber 23, and the wick 22. The wick is operated up and down by certain toothed wheels 40, shown in Figures 1, 2 and 4. Toothed wheels 40 are mounted on shaft 39, this shaft being operated by knob 32. Likewise mounted on shaft 39 is gear wheel 45 which engages gear 46, the latter driving a shaft carrying toothed wheel 40a. If the operator turns knob 32 counterclockwise (as viewed by him sitting in the car) the wheel 40 of Figure 4, being mounted on the same shaft will turn in the same direction as knob 32, however due to the choice of the draftsman the wheel 40 as viewed in Figure 4 would be turned clockwise. As viewed in Figure 4, when shaft 39 rotates clockwise, toothed wheel 40a is rotated counterclockwise and the wick is moved upward. When the toothed wheel 40 as viewed in Figure 4 is rotated counterclockwise, the wick moves downwardly.

In order that the operator in the car may always turn the wick to any desired height, I have provided a special mechanical arrangement best shown in Figures 2, 3 and 4. A pinion 50 (located in box 200) is mounted on shaft 39 and engages idle-wheel 51 which is mounted on shaft 52. The idle-wheel meshes with gear 54 which is supported by shaft 53. The shaft 53 carries a pawl 56 operating in connection with a ratchet wheel 55. When the shaft 39 is rotated clockwise (as viewed in Figure 4) so as to cause upward motion of the wick 22, the gear 54 moves in the same direction and pawl 56 operatively engages ratchet wheel 55 and rotates the latter along with shaft 38, gear 42, and toothed wheels 41 all in the same direction as shaft 39. Gear 43 meshes with gear 42 and drives toothed wheels 41a in a direction opposite that of 41, hence toothed wheels 41 and 41a cooperate in moving the wick upward when shaft 39 is rotated clockwise as viewed in Figure 4 (counterclockwise as viewed by the driver sitting in the driver's seat).

When the driver rotates shaft 39 in a direction opposite that mentioned in the foregoing paragraph, namely when he rotates shaft 39 clockwise as he views it (counterclockwise as viewed in Figure 4) the shaft 53 is rotated in the same direction as 39, and the pawl 56 slips with respect to ratchet wheel 55 in absence of other forces. Hence the toothed wheels 41 and 41a play no part in driving the wick downwardly, although as was mentioned earlier they do assist in driving it up. Toothed wheels 41 and 41a are quite free in their action and are rotated by the moving wick as it moves down, but these wheels play no part in any functional sense in moving the wick down.

It is apparent that whenever the wick is moved down by rotation of knob 32 to approach its off position that toothed wheels 40 and 40a will drive the wick down until it passes so low that it barely disengages wheel 40 and 40a. Further rotation of knob 32 is of no effect, it merely rotating toothed wheels 40 and 40a which are not in engagement with wick 22. Hence it is obvious that the wick 22 is always at the same starting position when the heater is ready to be started after having been turned off, namely it is always just below wheels 40 and 40a. When the heater is again turned on, the toothed wheels 41 and 41a are again in action and drive the wick up a fraction of an inch until it is again engaged by toothed wheels 40 and 40a, and the wick is then driven upward in proportion to the rotation of knob 32. Hence, knob 32 may be accurately calibrated for various wick heights. Various wick heights create various amounts of heat output and hence the heat output may be somewhat varied.

The electrical system will now be explained. The line L from the car battery lead to switch SW which may be a time clock, thermostat, or other switch, (switch SW may be omitted if control is effected only by knob 32). Switch SW is only used for automatic control and is shorted over when manual control by knob 32 is employed. When switch SW is a time clock, it may be adjusted to turn "on" at 7:45 A. M. for example in event a driver normally starts his car at say 8:00 A. M. The night before when the driver set the clock, he likewise turned the knob 32 clear "on" but of course this had no effect since switch SW is open and will not supply any operating current until 7:45 A. M. At 7:45 A. M., the switch SW will supply current to igniter 57 through bimetallic strip 33, contact strip 58 and shaft 39. The motor M will likewise be energized. The igniter will ignite the wick at 7:45 A. M. and a flame will continue. If for some reason the driver does not show up, the heater will not burn indefinitely for it will run out of gasoline after operating a few hours and stop. After the heater has run out of gasoline, the flame will cease and bimetallic strip 33 will cool reclosing the circuit to igniter 57. The heavy current drain of igniter 57 will operate the cut-out switch, thereby stopping the system. The cut-out will be tripped back in by the next operation of shaft 39 if suitable means are thereby employed.

It is apparent that plate 58 will make suitable contact with arm 59 for any wick height, as determined by shaft 39. If it is desired to vary the motor speed depending on wick height, this may be done by making 58 a resistance and so selecting the resistance value that the speed of the motor is proportional to the heat output of this wick 22. This will always effect uniform temperature of the air blown from 30.

As safety precautions, the fuel pipe 17 is provided with a cock 18 which opens only when knob 32 is turned on; and the air inlet holes 25' are covered by a plate 63 which is released by a bimetallic strip 60 in event of an excess temperature in the combustion chamber. The wall 61 of chamber 100 supports bimetallic strip 60 which normally holds plate 63 above holes 25'. In event of excess temperature the plate 63 is released and covers holes 25' thus snuffing out the flame for lack of air supply.

The holes 25' are located between the fire wall and the chamber 100 so as to minimize the effect of the automobile engine fan and the strong wind set up due to motion of the car. Holes 25' are of such size, and the pipe 25 is of such size that the fuel will not satisfactorily burn unless motor 14 is running. For example, if motor 14 is not running, there is no place for unburnt gases to escape and no satisfactorily large air inlet holes to support combustion.

It is obvious from the foregoing paragraph that failure of the motor, the suction blower or clogging of any part of the exhaust path cannot create a dangerous condition for the flame will die out promptly upon the stoppage of suitable air. When the heater is turned off, the wick is of course retracted and also the motor stops. Stopping of the motor apparently has an effect tending to react back into the combustion chamber for I have found that even if the apparatus is modified so the wick is not retracted that the stoppage of the motor will literally blow out the flame. I cannot explain the exact reason for this effect.

As a variation in the preferred form of safety protection shown in Figure 6, I may also protect against overheating by use of an overheating thermostat OT located in the electrical line and suitably placed in or near any part of the heating system that is liable to be overheated.

Some increase in the probability of ignition is attained if a resistance R and a thermal switch I are used with an arrangement such that resistor R heats thermal switch I to start the motor circuit within a few seconds after igniter 57 reaches ignition temperature. When the starting of the motor is delayed igniters 57 will readily ignite the wick 22 if they are within one-half inch thereof, but if the delayed starting feature is not used the igniters should be located very close to the wick and arranged to get very hot. Their cross-section may and preferably is large, so as to avoid cooling by the air blast and they may further if desired be located in a small cover which will shield them from the blast. Such a cover 202 is shown over igniter 57 in Figure 4.

It is apparent that with my construction, there is no possible way that unburnt gases can enter the passenger compartment. Gasoline cannot and does not burn in the passenger compartment. Moreover the combustion chamber is separated from the passenger compartment by the fire wall of the car, so that in event the driver should be involved in an accident which might set afire the gasoline in the gasoline tank 21, the occupants will be protected. The gas tank 21, as has been stated, is small, and therefore if it is broken due to crash-up of the car, no serious danger will result. By small, I mean the tank is of such size that it will operate the heater at the normal rate for no more than five hours. It is further apparent that combustion conditions in gasoline tank 21 and chamber 100 are very poor when the motor 14 is stopped, and hence the possibility of uncontrolled combustion or fires is quite remote; the only danger being in event the automobile should be involved in an accident that would radically dislocate the parts or effect a leak in the tank.

It is noted that exhaust pipe 24—25 passes directly from the combustion chamber through the fire wall 10 into passenger compartment 11. Tests show that a surprising amount of heat is conducted by the walls of this pipe, and that by no means all of the heat travels into the radiator portion of the heater, due to suction. The heat transmission by conduction is effective, as well as efficient, and is encouraged by making the walls of pipe 25, at least to and including one traversal of the radiator portion of the heater, relatively thick.

While I have illustrated one specific embodiment of my invention, I wish to state that the generic claims set forth below should not be limited to the precise form disclosed, since I desire to protect not only the precise form disclosed by me but all equivalent forms.

I claim to have invented:

1. An automobile heating system comprising a small fuel tank separate from the fuel tank of the automobile; a combustion chamber; a wick wetted in said first-named tank and extending into said combustion chamber; an igniter for igniting the end of the wick that is in the combustion chamber; means supporting said first-named fuel tank, said combustion chamber, said wick, and said igniter to position them all outside the passenger compartment of the automobile; means adapted to be connected to the fuel supply of the automobile for adding gasoline to said small fuel tank when the automobile engine is running and stopping supply of gasoline to said small tank when the automobile engine is not running; means for transmitting the heat generated in said combustion chamber to the passenger compartment and dissipating the same therein, forced draft means for supplying air to support combustion to said combustion chamber, and means operable to control said igniter and draft means either when the automobile engine is running or stopped whereby the heating system may be operated when the automobile engine has stopped.

2. An automobile heating system comprising a relatively small fuel tank which will be exhausted if operated without being refilled within five hours, a combustion chamber located nearby said tank, a wick wetted at one end in said tank and extending into the combustion chamber at its other end, an electrical igniter in the combustion chamber for igniting said wick, means supporting all of the above-recited parts on the fire wall of an automobile in the engine compartment, heat transfer means for transferring the heat generated in said chamber to the passenger compartment, means adapted to be connected to the fuel supply of the automobile for adding gasoline to said small fuel tank when the automobile engine is running and stopping supply of gasoline to said small tank when the automobile engine is not running; means for dissipating the heat thus transmitted throughout the passenger compartment, electrically driven means for effecting flow of combustion air into said combustion chamber, and electrical switching means controlling said igniter and electrically driven means, said switching means including means operable to energize said igniter and said electrically driven means to start the heater and generate heat when the automobile engine is either stopped or running.

3. An automobile heating system comprising a fuel tank of relatively small capacity which will be exhausted due to operation of the heater after no more than five hours at the maximum burning rate, means supporting said tank to position the same in the engine compartment of an automobile and separated from the operative parts of the automobile engine, means driven by the automobile engine for adding gasoline to said tank when the automobile engine is running and for stopping supply of gasoline to said tank when the automobile engine is not running, heat generating means including a combustion chamber mounted in said engine compartment and being supplied with gasoline from said tank for burning said gasoline irrespective whether the automobile engine is running or not, means for transferring heat from said combustion chamber to the passenger compartment of said automobile and dissipating the heat in said passenger compartment, and control means in the passenger compartment to control said heat generating means to start and stop the same independently of the operation of the automobile engine.

4. An automobile having a main gasoline tank, fuel pump, carburetor, and internal combustion engine for driving the automobile; and a heater for heating the passenger compartment of the automobile comprising a small gasoline tank separate from the above-named parts, a fuel line leading to said small tank and tapped between said carburetor and fuel pump, a combustion chamber, means for supplying gasoline from said small tank to said combustion chamber, all of the above-named parts being located outside of the passenger compartment of the automobile and separated therefrom by a wall of the passenger compartment, a pipe leading from the combustion chamber through the wall of the passenger compartment and passing back and forth therein so as to act as a radiator and then passing back through the wall of said passenger compartment to the outside thereof, an exhaust pump located outside said passenger compartment for exerting suction on the end of said pipe that passed back through the wall of the passenger compartment, a circulating fan within the passenger compartment for circulating air in said compartment over said radiator, and a common motor for driving said exhaust pump and said fan.

5. An automobile heater comprising a gasoline tank and combustion chamber mounted adjacent each other in the engine compartment of the automobile, a wick wetted at one end in said tank and adapted to burn at its other end in said combustion chamber, an exhaust pipe for said combustion chamber which passes through the fire wall of the automobile into the passenger compartment where it passes back and forth to sufficient extent to act as a radiator, said exhaust pipe extending back out of said passenger compartment into the engine compartment, a suction blower in the engine compartment for creating suction on the end of said exhaust pipe that extended back out of the passenger compartment, a circulating fan for blowing air over said radiator, a common motor for driving said suction blower and said fan, and a control knob for controlling energization of said motor; said combustion chamber defining air inlet holes therein for admitting air to support combustion, the said holes being of such limited size as to prevent combustion from taking place in said chamber in event said suction blower stops.

6. The device defined by claim 3 in which said heat generating means includes: an electrical igniter for igniting said fuel in said chamber, electrical means for effecting flow of combustion air to said chamber, and switching means operable to energize said igniter and electrical means independently of operation of the automobile engine whereby the heating system may be operated at normal output to heat the passenger compartment while the automobile engine is not running.

7. In a heater, a wick, means wetting a first end of the wick with fuel, an igniter adjacent the second end of said wick, a blower for passing combustion air past said second end, and means controlling said blower to delay starting thereof until the wick is ignited and to start the blower after the wick is ignited.

8. In a heater, a wick, means for igniting the wick comprising a hot wire electrical igniter adjacent said wick, a blower for effecting passage of combustion air across said wick to raise the flame thereof from contact with the wick, and electrical means for first energizing the igniter and after the wick is ignited then starting the blower.

9. In an automobile heater adapted to be mounted in an automobile having a source of fuel and a fire wall separating the engine compartment and the passenger compartment, a combustion chamber, fuel means adapted to be mounted in the engine compartment of the automobile and cooperating with the fuel supply of the automobile to effect passage of fuel to said combustion chamber, said means including means to conduct such fuel to said combustion chamber, control means adapted to be mounted in the passenger compartment of said automobile for varying the quantity of fuel delivered to said combustion chamber by said first-named means, said control means having a plurality of different calibrations which permit the control means to be positioned in predetermined manners that respectively effect different predetermined fuel flow rates, a sealed radiator adapted to be mounted in said passenger compartment, said radiator having an intake connected to said combustion chamber to receive burnt gases therefrom, said radiator having an exhaust end thereof, an exhaust pump connected to said exhaust end, a circulating fan adjacent said radiator, an electric motor having a horizontal shaft perpendicular to the fire wall and extending from said motor in opposite directions therefrom and carrying said fan on the end nearest the rear end of the car, the other end of said shaft being connected to said exhaust pump for operating the latter, said exhaust pump including means for exerting sufficient suction on said radiator to operate the latter below atmospheric pressure, said combustion chamber having inlets for combustion air, said exhaust pump being sufficiently powerful to cause flow of such combustion air into said chamber, said fuel means including means for effecting fuel passage to said chamber irrespective of the operation of said exhaust pump whereby the capacity of the exhaust pump need only be large enough to effect circulation of burnt gases and flow of combustion air, a hot wire resistance igniter mounted associated with said combustion chamber to ignite fuel therein, a shield adjacent said igniter for protecting the same from the cooling effect of the flow of combustion air in said chamber, a thermal switch in series with said igniter responsive to combustion to deenergize the igniter, and means adapted to be attached to the fire wall of an automobile for supporting said thermal switch, motor, exhaust pump, circulating fan, radiator, combustion chamber, igniter and shield whereby they are carried by the fire wall.

10. In an automobile heater, means including a combustion chamber for burning fuel, said means defining air inlet holes for supplying combustion air, a radiator having an intake connected to said chamber, said radiator having an outlet, an exhaust pump connected to said outlet and including means for exerting sufficient suction on the radiator to draw combustion air in said inlet holes, an electrical hot wire igniter cooperating with said combustion chamber to ignite fuel therein, protective means for reducing the cooling effect of said combustion air on said hot wire igniter, means additional to said exhaust pump connected to the fuel supply of the automobile for conveying fuel flow to said combustion chamber, a conduit for supplying fuel to the last-named means, a circulating fan for passing air across said radiator, a motor having a shaft directly connected to said exhaust pump and circulating fan, a thermal switch responsive to combustion to deenergize said igniter, and means for mounting said radiator and circulating fan in the passenger compartment of an automobile.

11. In an automobile heater, means for burning fuel including a combustion chamber having an outlet, said means defining air inlet holes for conducting air to said chamber, a sealed radiator having an inlet connected to the outlet of said chamber, said radiator having an outlet, an exhaust blower connected to said outlet for reducing the pressure in said combustion chamber and radiator below atmospheric pressure thereby effecting flow of combustion air in said air inlet holes, a circulating fan for blowing air to be heated over said radiator, means whereby said radiator and fan may be mounted in the passenger compartment of an automobile, an electric motor having a shaft directly coupled to said blower and fan, means operable independently of said blower adapted for connection to the fuel supply of the automobile for conveying flow of fuel to said combustion chamber, a hot wire igniter in said chamber for igniting the fuel, and switching means adapted to be connected to the automobile battery for starting energization of said igniter and motor, said switching means including manually operable means for controlling the same and adapted for mounting in the passenger compartment of the automobile, said air inlet holes being of such small size that if the exhaust blower should stop the flame will go out.

12. The device defined by claim 3, in which said heat generating means includes: an electrical igniter for igniting said fuel in said chamber, electrical means for effecting flow of combustion air to said chamber, and switching means operable to energize the igniter and electrical means independently of operation of the automobile engine whereby the heating system may be operated at normal output to heat the passenger compartment while the automobile engine is not running; said electrical means also including means to convey exhaust burnt gases from said chamber operable by said switching means independently of operation of the automobile engine.

WILLIAM D. HALL.

REFERENCES CITED

The following references are of record in the file of this patent:

UNITED STATES PATENTS

| Number | Name | Date |
|---|---|---|
| 65,010 | Reynolds | May 21, 1867 |
| 218,316 | Robertson | Aug. 5, 1879 |
| 221,733 | House et al. | Nov. 18, 1879 |
| 445,789 | Whittingham | Feb. 3, 1891 |
| 471,866 | Jones | Mar. 29, 1892 |
| 588,669 | Van Hoevenbergh | Aug. 24, 1897 |
| 797,979 | Sayre | Aug. 22, 1905 |
| 1,408,433 | Barrows | Mar. 7, 1922 |
| 1,544,026 | Morse | June 30, 1925 |
| 1,583,238 | Scudder | May 4, 1926 |
| 2,172,667 | Nelson | Sept. 12, 1939 |
| 2,175,812 | Meyerhofer | Oct. 10, 1939 |
| 2,192,389 | Treca | Mar. 5, 1940 |
| 2,207,776 | Black | July 16, 1940 |
| 2,243,609 | Spackman | May 27, 1941 |
| 2,286,855 | Holthouse | June 16, 1942 |
| 2,308,887 | McCollum | Jan. 19, 1943 |
| 2,308,888 | McCollum | Jan. 19, 1943 |
| 2,333,602 | Van Almelo | Nov. 2, 1943 |
| 2,349,694 | Barr | May 23, 1944 |